Feb. 18, 1958 R. P. SNODGRASS 2,823,464
FLIGHT INDICATING SYSTEM
Filed Jan. 8, 1954 3 Sheets-Sheet 1

INVENTOR
REUBEN P. SNODGRASS
BY
ATTORNEY

Feb. 18, 1958  R. P. SNODGRASS  2,823,464
FLIGHT INDICATING SYSTEM
Filed Jan. 8, 1954  3 Sheets-Sheet 3

INVENTOR
REUBEN P. SNODGRASS
BY
ATTORNEY

United States Patent Office 2,823,464
Patented Feb. 18, 1958

2,823,464

FLIGHT INDICATING SYSTEM

Reuben P. Snodgrass, Lake Ronkonkoma, N. Y., assignor to Sperry Rand Corporation, a corporation of Delaware Application January 8, 1954, Serial No. 403,018

15 Claims. (Cl. 33—204)

The subject of this invention is a novel flight indicating system. More particularly, this invention is concerned with an improved combination of a roll or bank indicator and a heading error indicator which are co-operatively integrated to simplify the guiding of an aircraft from an old course into a new course by means of a flight maneuver which may take the form of a substantially asymptotic approach, for instance.

In accordance with the present invention, the pilot is presented with simple, logical, and easy-to-follow combined flight information by which he may bank the aircraft so that it will be guided from one heading to another desired heading, and by maintaining alignment of the several correlated indications on the flight instrument by controlling bank angle, the bank of the aircraft will be progressively and gradually diminished so that the aircraft will assume zero bank or level flight at the same instant that the heading of the aircraft coincides with the preselected new heading, i. e., the craft will execute an asymptotic approach to the selected heading.

The object of the invention is therefore to combine flight information in a unitary instrument to facilitate the execution of precision flight maneuvers by flying the aircraft so as to maintain a logical and simple relation between the indications presented on the instrument.

The advantages and features of the present invention, as compared to the multiplicity of segregated and non-cooperative instruments customarily employed in the prior art, will appear more fully from an understanding of the theory of operation of the several embodiments of the invention illustrated in the drawings in which.

Roll and pitch indicators, both in separate and combined forms, are known in the aircraft instrument prior art. Similarly, aircraft heading instruments with heading selectors and heading error indicators associated therewith also have been used in a number of forms and arrangements.

The present invention contemplates a system in which a bank indicator, with or without pitch indicator, is combined with and is cooperatively correlated to a stabilized heading indicator and a heading error indicator slaved thereto. The latter may also be regarded as an indicator of desired change in heading. A logical and convenient way to arrange the combined instrument is to orient the stabilized heading indicator so that a vertical index or lubber line will indicate the true heading of the craft.

In accordance with the present invention, such an indicator may be mounted about the periphery of a bank indicator in which the disposition or attitude of the aircraft about the roll axis is shown by an indicium adapted to be aligned with preferably the same vertical lubber line or index on the instrument case, when the aircraft is in level flight with respect to its roll axis. The heading indicator is provided with a heading error indicator, which by use of an adjustable selector, may be displaced from the vertical to the right or the left of the lubber line to the desired setting of a new heading.

Figure 3:
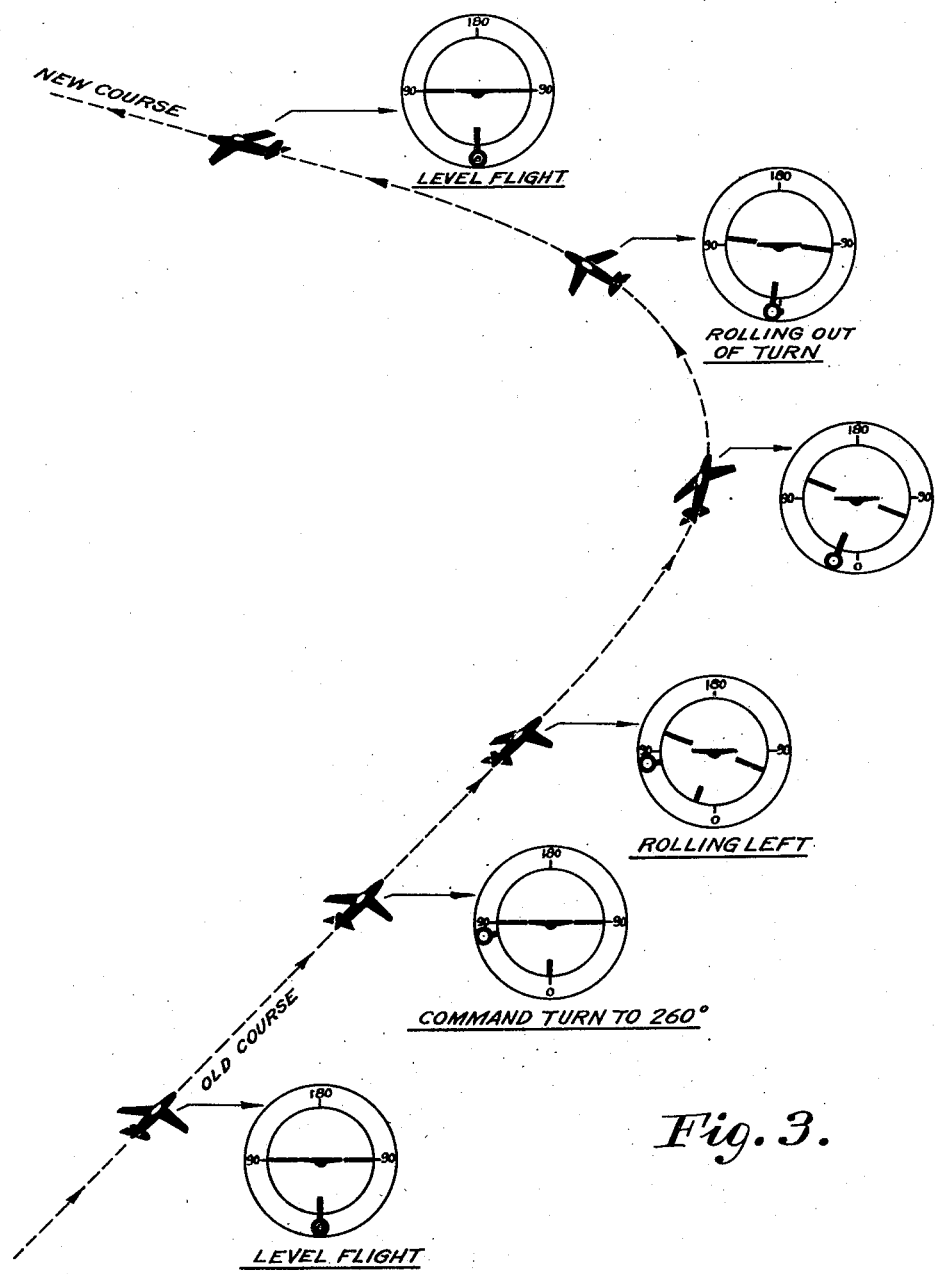
Fig. 3 is a pictorial view of typical progressive attitudes of an aircraft during the execution of its flight from an old heading to a newly selected heading and the corresponding progressive flight indications of a flight instrument arranged to operate in accordance with the present invention.

The bank indicator is related to appropriate indices so that when the bank attitude of the aircraft is changed to align the roll or bank indicium with the heading error indicator, steering of the aircraft will be effected toward a new heading corresponding to that selected by use of the heading error indicator and heading selector. The magnitude of the heading error will gradually diminish as the craft approaches the new heading. By simply maintaining alignment of the bank indicator with the gradually diminishing heading error as indicated by movement of the heading error indicator towards the fixed index, the pilot executes the necessary flight maneuver to bring the aircraft on a heading which is precisely that of the newly selected heading. In following the maneuver through maintaining such alignment, the aircraft will be returned to zero roll or bank at the same instant of time that the new heading is achieved. Thus, by this simple procedure directed by the operation of the instrument of the present invention, the aircraft is directed on a course of flight describing a substantially asymptotic approach from the old heading to the new heading which was preselected by adjustment of the heading selector. The progressive operation and appearance of the flight instrument during such a maneuver is illustrated in Fig. 3, adjacent respective illustrations of the aircraft attitudes obtained in following the dictates of the instrument. This illustration will be explained more fully hereinafter.

Figure 1:
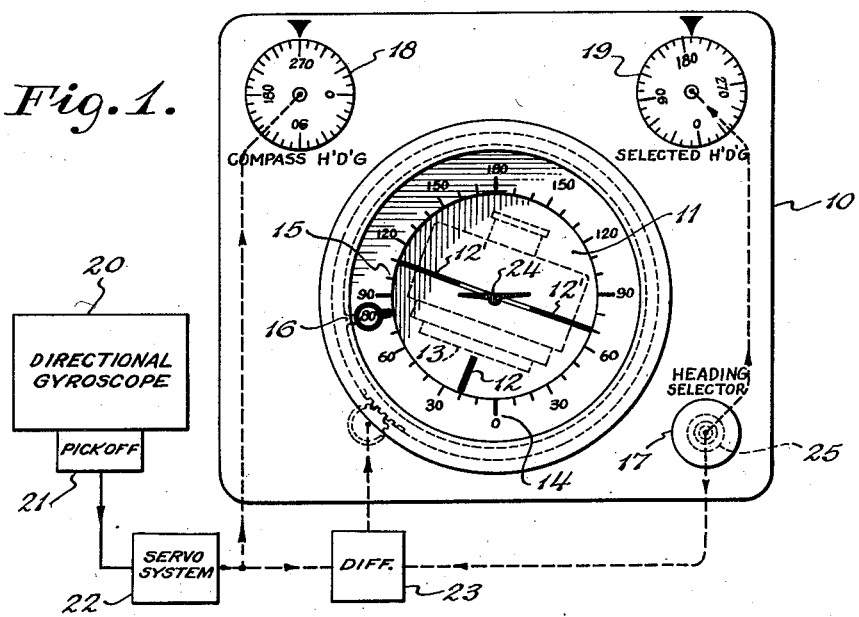
Fig. 1 is a schematic diagram of a flight indicating system arranged in accordance with the present invention.

Referring now to Fig. 1, it may be seen that there is illustrated a flight indicating system arranged to operate in accordance with the present invention. The flight indicating instrument 10 comprises, in this particular embodiment, a pitch and roll attitude indicator 11, roll attitude being indicated by rotation of a horizon bar 12' and a roll pointer 12 relative to a miniature airplane symbol 24, and pitch attitude being indicated by displacement of the horizon bar 12' relative to the airplane symbol 24. In normal level flight attitude the horizon bar 12' preferably lies coincident with the laterally extending wings of airplane symbol 24. The bar 12 is stabilized in pitch and roll relative to the earth's horizon by means of a vertical gyroscope 13. In this particular embodiment of the present invention, a panel-mounted vertical gyro may be used, the vertical gyro 13, horizon bar 12', and airplane symbol arrangement may be substantially identical with that disclosed in U. S. Patent No. 2,485,552, issued October 25, 1949 to E. F. Aumuller and assigned to the same assignee as the present invention.

It should be noted that when the aircraft is in level flight with respect to the roll axis, the roll or bank indicium 12 is in vertical alignment with a fixed reference index such as that shown at 14.

About the periphery of the pitch and roll indicium is a fixed card 15 appropriately divided with scale markings for indicating the number of degrees of heading deviation from the on-course or lubber reference 14. A heading error or desired change in heading indicator 16 is arranged to be rotatably or circumferentially displaced in relation to the fixed card 15 in accordance with the adjustment of a heading selector 17. An indicator 18 at the upper left hand corner of the instrument may be provided for displaying the actual compass heading of the craft in flight and in the upper right hand corner of the instrument a similar indicator 19 may be provided for displaying the selected heading. Both these latter indicators 18 and 19 may be of any suitable type and for particular applications, a drum counter type of indicator, for instance, may be preferable.

The difference between the actual compass heading and the selected heading, i. e., heading error, is displayed by the setting of the heading error indicator 16 with respect to the fixed card vertical on-course index 14.

A directional reference 20, which may be a directional gyro in a gyro magnetic compass system, a magnetic compass, or other suitable means, furnishes heading information to the instrument as displayed by the indicator 18 in the upper left hand corner of the instrument 10. By means of a pick-off 21 and a conventional servo system 22, a differential 23 receives a directional reference signal and the heading selector signal so as to produce an output which will displace the heading error indicator 16 in a direction and for a number of degrees indicated on the scale 15 of the instrument 10 in accordance with the magnitude and sense of the difference between the actual aircraft heading and the selected new or desired heading.

It will be understood that in selecting a new heading by means of heading selector 17, the operator disengages a clutch 25, as by pushing in or pulling out the heading selector knob 17, and positions the heading error indicator 16 through one input element of differential 23, the other input element thereof being held fixed by the servo system 22. After the new heading has been set, the clutch 25 is actuated so that it remains fixed relative to the instrument housing. Therefore, with said one input element of differential 23 fixed, the servo system 22 may drive through the differential 23 to position the heading error indicator 16 in synchronism with the changes in heading of the craft.

In this particular embodiment of the invention, an aircraft is represented by a symbol 24 and the bank indicium 12' is represented as a horizon, so that when the indicium is rotationally displaced, the aircraft symbol 24 will appear to bank with respect to the indicium 12'. Assuming the conditions indicated on the flight instrument as illustrated in Fig. 1, it will be seen that the actual compass heading of the aircraft is 270°. The selected heading of the new course is 190°. This, of course, will necessitate an 80° turn of the craft to the left in order for the craft to assume its new heading. Since the indicium 12 is stabilized relative to the earth's horizon, it will appear to rotate clockwise when the aircraft is banked to the left. Therefore, in order to effect alignment of the lower indicium 12 of the bank indicator with the heading error indicator 16, the aircraft must be banked to the left. As the aircraft assumes a desired roll attitude for, say, a coordinated turn, it will execute a turn toward the new heading and the heading error indicator 16 which is now slaved to the directional reference 20 will indicate progressively less and less heading error as the craft turns toward the new heading. Thus by maintaining alignment of the lower portion of the bank indicator 12 with the course heading error indicator 16, the craft is flown along a substantially asymptotic flight path or approach to the new course.

In accordance with the present invention, the novel cooperative features of the combined and integrated instrument afford a logical and easy-to-follow method of effecting flight maneuvers which might otherwise be comparatively difficult and complex due to the necessity of observing and reading a multiplicity of instruments, each presenting different types of information which must be constantly and simultaneously synthesized and interpreted by the pilot. With an instrument constructed in accordance with the teachings of the present invention, the pilot need not anticipate his roll-out to the new heading, thereby eliminating any possibility of overshooting or undershooting the new heading.

Figure 2:
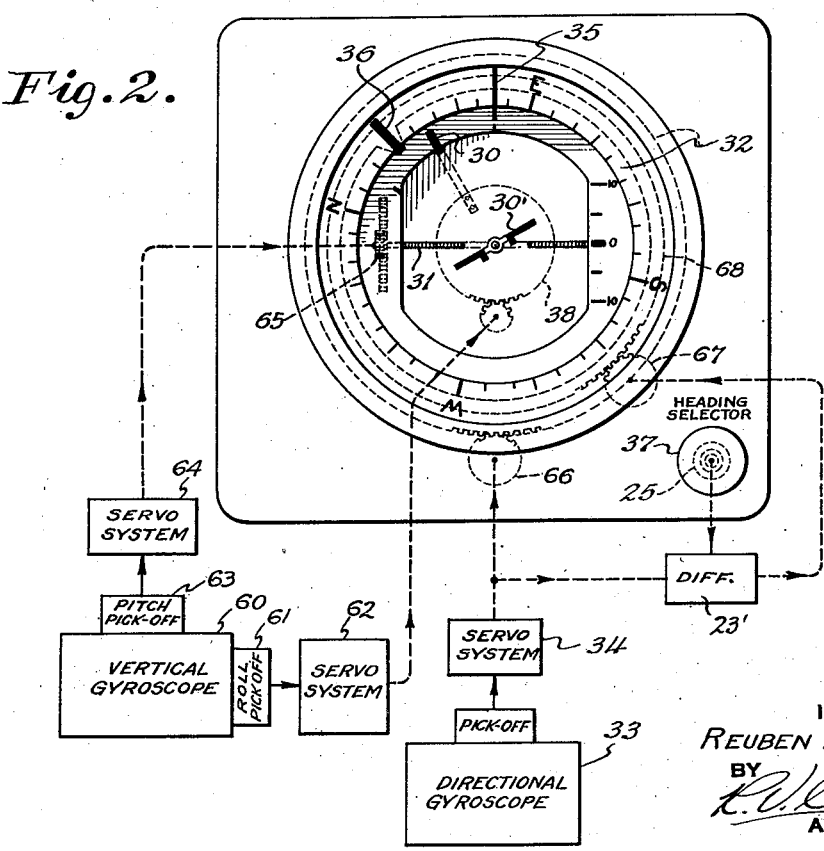
Fig. 2 is another embodiment of the present invention in the form of a flight indicating system.

A second embodiment of the invention is illustrated in Fig. 2. In this embodiment, the instrument may be of the repeater type. Furthermore, the roll or bank indicium 30 of Fig. 2 is separate and distinct from the pitch indicator 31. However, the roll and bank indicator of Fig. 2 incorporates that feature of the bank indicator of Fig. 1 which affords a vertical alignment of the indicium 30 when the aircraft is in level flight with respect to roll axis. Roll attitude, in this instance, is indicated by rotation of miniature aircraft 30'. In the embodiment of Fig. 2, a rotatably mounted, directionally stabilized compass card 32 is arranged in concentric relation to the bank indicator 30 and is oriented by means of a signal from a directional reference 33 and appropriate drive means 34 so that the actual heading of the aircraft is read with respect to the vertical lubber line 35.

A heading error indicator 36 is provided and may be adjusted or positioned by the heading selector 37 in a manner similar to that described in connection with Fig. 1. However, in the present embodiment, instead of the heading error indicator indicating the amount of heading error in net degrees difference between the old and new headings as in Fig. 1, the newly selected heading is indicated by the setting of the heading error indicator 36 relative to the rotatably mounted, stabilized compass card 32 and the heading error or desired change in heading is exhibited by the angle between indicator 36 and index 35.

As stated above, the embodiment of the instrument illustrated in Fig. 2 may be a repeater type instrument in which the roll index 30 and miniature aircraft 30' are positioned in roll by means of a remotely located vertical gyroscope 60. Vertical gyroscope 60 is provided with a roll pick-off 61 which actuates a conventional roll servo system 62, the output of which positions roll index 30 and miniature aircraft 30' in accordance with the roll attitude of the aircraft through suitable gearing 38 to which both roll index 30 and miniature aircraft 30' are fixedly attached. In a similar manner, pitch attitude indicating bar 31, which is illustrated as being broken away at the center thereof for clarity of illustration, is positioned in accordance with pitch attitude from vertical gyroscope 60 through suitable pitch pick-off 63 and conventional pitch servo system 64. The output of servo system 64 drives pitch attitude indicator 31 through a suitable drive mechanism such as rack and pinion drive 65.

As stated above, the directional gyroscope positions compass card 32 through suitable gearing 66 in accordance with the magnetic heading of the aircraft, which heading is indicated to the pilot by means of an index lubber line 35 which is fixed to the instrument casing and is also common to the roll index 30. As in Fig. 1, heading selector 37 operates through differential 23' to position heading error indicator 36 relative to compass card 32 by means of suitable gear drive 67. As shown in dotted lines, gearing 67 meshes with a ring gear 68 to which heading error indicator 36 is fastened. Again, a clutch 25 is provided for clamping one side of differential 23' after a heading selection operation so that both heading error indicator 36 and compass card 32 are driven in synchronism.

When the new heading is set into the instrument illustrated in the embodiment of Fig. 2 by appropriate adjustment of the heading selector 37, the heading error indicator 36 is deflected circumferentially to the right or the left of the lubber line 35 to the heading desired. In order to align the bank indicator 30 with the heading error indicator 36, the pilot must bank the aircraft by an appropriate amount to the right or left, as the case may be.

It will be noted that in the embodiment of Fig. 2, the roll and bank indicator is arranged so that the aircraft symbol 30' depicted on the instrument appears to be rotationally displaced about the center of the instrument and therefore appears to bank with respect to a horizon as defined by pitch indicator 31. In other words, the pointer 31 appears to be stabilized and the bank indicator 30' appears to be rotated relative thereto in a manner converse to that of the embodiment illustrated in Fig. 1. In this embodiment of the present invention, i. e., Fig. 2, the roll servo system 62 actuates gear 38 in the manner to rotate miniature aircraft 30' and bank index 30 in the same sense or direction that the aircraft is actually banking but through an angle substantially twice that through which the aircraft is actually banked. Flight corrections by the pilot to align the roll and bank indicator 30 with the heading error indicator 37 and maintain such alignment to the conclusion of the flight maneuver, direct the aircraft in an asymptotic approach to its new heading in substantially the same manner and progression as that described in connection with Fig. 1 and Fig. 3.

Figure 4:
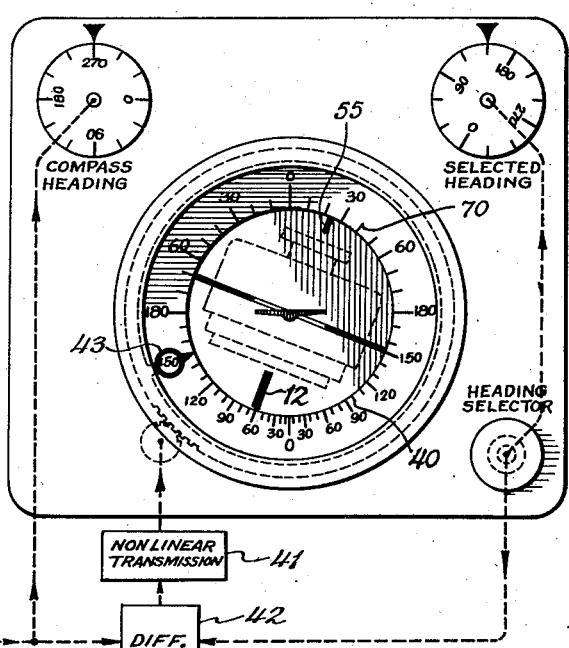
Fig. 4 is a modified embodiment of the present invention which has a non-linear heading error indication.
Figure 5:
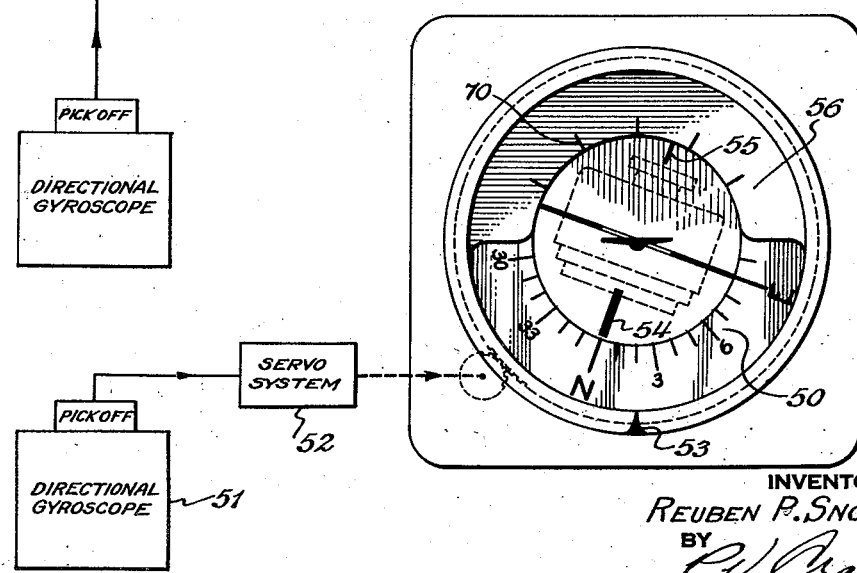
Fig. 5 is still another embodiment of the present invention.

Although the indication afforded by the instrument illustrated in Figs. 1, 4 and 5 of the present invention includes a horizon bar 12' which is positioned in both roll and pitch by the gyro 13, it is to be understood that the indication provided by the present invention may apply equally well to an attitude type gyro such as that disclosed in U. S. Patent No. 2,546,989 issued to O. E. Esval et al. and assigned to the same assignee as the present invention. As shown in this patent both the roll and pitch attitude of the aircraft are indicated by means of a gyro-stabilized spherical element having an equatorial line or horizon demarcation line which is positioned in both roll and pitch by the gyro. In addition, a central meridian line is provided which indicates angle of roll of the aircraft. With this type of indication this meridian line forms the roll indicium 12 of Figs. 1, 4 and 5, but instead of being a short line as illustrated, this line extends completely (and normally vertically) across the bezel opening of the instrument. Thus, with this latter or attitude type of instrument the roll and pitch indicators are combined on the same movable element. However, the cooperative correlation of the roll indicator and the heading error indicator will afford the same guide for enabling the pilot asymptotically to approach a desired heading in the same manner as that set forth in Figs. 1, 4 and 5 of the present invention. Thus, although several embodiments of the present invention have been illustrated, other embodiments thereof may be contemplated without departing from the true scope and spirit of the invention disclosed herein.

In using the flight indication afforded in accordance with the present invention, it may be desirable to effect a turn of the aircraft on to a new heading lying at a considerably greater heading error angle than the maximum safe bank attitude angle of the aircraft may permit. For instance, it may be desired to turn the aircraft through an 80° angle to bring it upon a new heading as is illustrated in Fig. 3. However, the maximum safe banking angle and standard safety procedures in executing flight maneuvers may preclude banking the aircraft more than 25°, for instance. In this event, the heading error indicator is rotated by an appropriate amount, i. e., 80° as shown by the second illustration from the bottom of Fig. 3. Then, the aircraft is banked in the proper direction so as to bring the roll and bank indicator of the instrument to the maximum safe banking angle, i. e., 25° as shown in the third illustration from the bottom of Fig. 3. Due to the bank attitude of the aircraft, a turn will begin to be executed and the aircraft will approach the new heading. The heading error indicator, in response to the turn of the aircraft, will indicate progressively less and less heading error. By maintaining the aircraft at the 25° bank angle, the pilot will cause the indication of the heading error to gradually diminish from 80° until it also is 25°, and is aligned with the roll and bank indicator as shown in the fourth illustration from the bottom of Fig. 3.

From that point of the flight maneuver, the pilot merely maintains the alignment of the heading error indicator with the roll and bank indicator as is shown in the fifth illustration from the bottom of Fig. 3 and in the same manner as has been previously described in connection with the execution of turns through smaller angles.

The embodiment of the present invention illustrated by Fig. 4 utilizes a non-linear error indication to afford a variation of the normal asymptotic flight approach in executing turns from one heading to another. The embodiment of Fig. 4 is substantially the same as that of Fig. 1 except that the fixed scale 40 which is divided non-linearly on its lower half and a corresponding non-linear transmission 41 has been interposed between the differential 42 and the drive for the error indicator 43. In this manner the heading error indicator 43 is made to read the true error between actual heading and the selected heading on the non-linear scale 43.

The alignment of the bank indicium 12 with the heading error indicium 43 will be effected by a different bank attitude than is necessary to achieve alignment with a linear heading error scale. The bank attitude which effects alignment on the non-linear scale will be more or less than that necessary for analogous alignment on a linear scale dependent upon which end of the scale is compressed. This modified embodiment of the present invention affords a great variety of flight patterns which may be achieved by maneuvering the aircraft to effect and maintain alignment of the correlated indices of the flight instrument as has previously been described in connection with the several other embodiments disclosed herein. In the embodiment of Fig. 4, the angle of bank of the craft may be indicated on a linear scale 70 at the upper portion of fixed scale 43 as by index 55.

Fig. 5 schematically presents another embodiment of the present invention and shows the craft to be banking to the left to bring the craft to a northerly heading from a heading 20° east of north. It will be noted that in this version there is no heading error indicator and this fact tends to simplify use of the instrument by an aircraft pilot in some respects. The azimuth heading scale 50 is driven directly in response to the heading of the aircraft with respect to a directional reference 51 through means of a conventional servomechanism 52. As in the other embodiments of the invention disclosed herein, the compass card or azimuthal heading scale 50 is oriented so as to give a present course reading adjacent a vertical index or lubber line 53. The scale of the compass card 50 reads from north, or 0°, to 360° in a counterclockwise direction. With the roll indicium 54 arranged as in Fig. 1 to deflect to the left to indicate a left bank attitude as illustrated in Fig. 5, the reversal of the compass card scale to read counterclockwise from north instead of clockwise effects a cooperative function of the instrument in the system environment in accordance with the present invention whereby alignment of the roll indicium 54 with a desired new heading reading on the azimuthal heading scale 50 results in a bank attitude of the aircraft which will cause the aircraft to be directed on a substantially asymptotic flight approach from the present heading to the newly selected heading. Much in the manner of the other embodiments disclosed herein, alignment of the roll indicium and the desired heading calibration is maintained by appropriate flight corrections in roll until both coincide with the vertical index or lubber line 53, at which time the aircraft has achieved the new heading. It should be noted, however, that a heading error indicator per se is not necessary in use of the instant embodiment. This feature makes it possible for the pilot to use the indicator with no manual manipulation.

The upper portion 56 of the indicating instrument of Fig. 5 may be masked to avoid any confusion in reading compass card 50 and may be divided in an appropriate fixed scale to indicate bank attitude or roll angle by reference to an upper roll indicium 55.

Since many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. In an aircraft flight indicating instrument the combination of an indicium mounted for movement in at least one degree of freedom, a reference index, means including a vertical reference device for deflecting said indicium from said reference index in a direction and to an amount depending upon the direction and magnitude of the roll attitude of said aircraft, and indicator means for indicating a desired change in heading of said aircraft from an initial heading as a deflection of said indicator from said reference index in a direction therefrom the same in sense as the movement of said indicium produced by the roll attitude of the aircraft required to produce a turn thereof in a direction to approach said desired heading whereby a substantially asymptotic flight approach to said desired heading will be attained by progressive corrections of craft roll attitude necessary to effect and maintain alignment of said indicium with respect to said heading indicator.

2. In an aircraft flight indicating instrument, the combination of first indicator means mounted for movement in two degrees of freedom about mutually perpendicular coplanar axes for indicating the roll and pitch attitude of the aircraft, said first indicator means being adapted for alignment with vertical and horizontal indexes respectively to indicate level flight, means for deflecting said first indicator means about the first of said axes in a direction and for a distance depending upon the magnitude and direction of roll of said aircraft, means for deflecting said first indicator means about the second of said axes in a direction and for a distance depending upon the pitch of said aircraft, and a second indicator means for indicating the heading error of said aircraft with respect to a preselected heading as a deflection thereof from said vertical index in a sense of direction therefrom which is the same as the sense of the deflection of said first indicator means relative to said vertical index, whereby a substantially asymptotic flight approach to a desired heading will be attained by progressive flight corrections in roll necessary to effect and maintain alignment of said roll indicator means with said heading error indicator means.

3. In an aircraft flight indicating system, the combination of an indicator having an indicium mounted for movement in one degree of freedom, a reference index, a roll reference device, means responsive to said roll reference device for deflecting said indicium relative to said reference index in response to deviations of said aircraft from the reference direction provided by said roll reference device, a heading reference device, a heading scale, means responsive to said heading reference device for orienting said heading scale relative to said reference index in accordance with the heading of said aircraft, and an indicator means positionable with respect to said heading scale for indicating the heading error between an existing heading and a desired heading as a deflection thereof from said reference index in the same sense of direction therefrom as the sense of deflection of said indicium produced by a bank of the aircraft required to produce a turn in the direction to reduce said error, whereby a substantially asymptotic flight approach to said desired heading will be obtained by progressive flight corrections in roll necessary to effect and maintain alignment of said indicium with said heading error indicator means.

4. In an aircraft flight indicating system, the combination of a vertical reference index, a first indicium mounted for movement about a first axis in response to the roll attitude of said aircraft, said first indicium when aligned with said vertical index indicating level flight of the aircraft with respect to its roll axis, a lateral reference index, a second indicium mounted for movement about a second axis in response to the pitch attitude of said aircraft, said second indicium when aligned with said horizontal reference index indicating level flight of the aircraft about its pitch axis, a directional reference device, a rotatable azimuthal heading scale cooperative with said vertical reference index and mounted concentrically with said first axis, means responsive to said directional reference device for rotating said heading scale whereby to indicate the heading of the aircraft as a deflection of said scale with respect to said vertical reference index, the sense of rotation of said heading scale being opposite to the direction of movement of said first indicium in response to banking of said aircraft, and indicator means for indicating the heading error of the craft with respect to a preselected heading as a deflection from said vertical reference index in the same sense of direction therefrom as the sense of deflection of said first indicium produced by a roll of said craft necessary to produce a turn in a direction to reduce such error, whereby a substantially asymptotic flight approach to said preselected heading will be obtained by progressive flight corrections in roll necessary to effect and maintain radially co-extensive alignment of said first indicium with said heading error indicator means.

5. In an aircraft flight indicating system the combination of an indicium rotatably mounted for movement about an axis representative of the roll axis of the aircraft, a common index, a roll reference device, means to rotate said indicium for a distance and in a direction from said common index in response to the magnitude and direction of deviation of said aircraft from the roll reference provided by said roll reference device, a directional reference device, a rotatable compass card mounted in concentric relation to said indicium, means to rotate said compass card for a distance and in a direction from said common index opposite to the direction of turning of said aircraft produced by the direction of rolling thereof in response to the deviation of the craft from the reference provided by said directional reference device, and means for indicating the heading error of said aircraft with respect to a selected heading as a deflection thereof from said common index in the same sense of direction therefrom as the sense of deflection of said roll indicium produced by bank of the aircraft required to produce a turn in a direction to reduce said error, whereby a substantially asymptotic path of flight to said selected heading will be attained by controlling the progressive roll attitudes of said aircraft necessary to effect and maintain radial alignment of said indicium with said heading error indicator means.

6. In an aircraft flight indicating instrument, the combination of a common reference index, an indicium mounted for movement in at least one degree of freedom, said indicium being adapted for alignment with said common index to indicate level flight about the roll axis of the aircraft, means for deflecting said indicium in a direction and for a distance depending upon the magnitude and direction of the roll of said aircraft, and indicator means for indicating the heading error of said aircraft with respect to a preselected heading as a deflection thereof from said common index in the same sense of direction therefrom as the sense of deflection of said indicium produced by a bank of the aircraft required to produce a turn in a direction to reduce said error and having a magnitude which is a non-linear function of said heading error, whereby a substantially asymptotic flight path to said preselected heading as determined by said non-linear function will be attained by progressive flight corrections in roll necessary to effect and maintain alignment of said indicium with said heading error indicator means.

7. In an aircraft flight indicating system the combination of a common reference index, and indicator having a roll indicium mounted for movement in one degree of freedom about an axis representative of the roll axis of said aircraft, said indicium being adapted for alignment with said reference index to indicate level flight, a device providing a roll reference, means for deflecting said indicium in response to the deviation of said aircraft from the roll reference provided by said roll reference device, a directional reference device, a rotatable azimuthal heading scale mounted in concentric relation to the axis of movement of said roll indicium, and means to orient said azimuthal heading scale in response to the heading of said aircraft with respect to the reference provided by said directional reference device, said azimuthal heading scale and said orientation means being so arranged that alignment of said roll indicium with a desired new heading on said azimuthal scale will indicate a bank attitude of said aircraft effecting a substantially asymptotic approach to said desired new heading.

8. An aircraft flight indicating instrument comprising a first movable index, a second movable index, a common fixed reference index, said movable indexes being mounted in said instrument in a manner such that they may be mutually aligned with respect to each other and also with respect to said common index, means for positioning said first index relative to said common index in accordance with the roll attitude of the aircraft, and means for positioning said second index relative to said common index in accordance with the heading of said aircraft, said second index representing a desired heading of said aircraft and the positioning of said second index relative to said reference index being in the same sense as the movement of said first index in response to banking of said aircraft necessary to produce a turn of the craft in a direction to produce alignment of said second index with said reference index, whereby an asymptotic approach to said desired heading may be effected by controlling the roll attitude of the aircraft in a manner to maintain alignment between said first and second indexes, said desired heading being attained with said aligned indexes are both aligned with said common index.

9. An aircraft flight indicating instrument comprising a first movable index, a second movable index, a common fixed reference index, said movable indexes being mounted in said instrument in a manner such that they may be mutually aligned with respect to each other and also with respect to said common index, means for positioning said first index relative to said common index in accordance with the roll attitude of the aircraft, and means for positioning said second index relative to said common index in accordance with a desired heading of the aircraft and thereafter for positioning the same in accordance with changes in the heading of the aircraft, the sense of the positioning of said second index from said reference index in accordance with the desired heading being the same in sense as the positioning of said first index therefrom in response to banking of the craft in a direction to produce turning of the craft toward said desired heading, whereby an asymptotic approach to said desired heading may be effected by controlling the roll attitude of the aircraft in a manner to maintain alignment between said first and second indexes.

10. An aircraft flight indicating instrument comprising a fixed reference index, a fixed scale extending in opposed directions from said reference index for indicating deviations of said aircraft from an existing heading, said reference index representing zero deviation, a bank index movable relative to said reference index and scale in accordance with the bank angle of said aircraft, a heading selector indicator adjustable relative to said scale for indicating a desired departure in the heading of said aircraft from said existing heading, and means for thereafter positioning said heading selector in accordance with changes in the heading of said craft, the sense of the positioning of said heading selector from said reference index being in the same sense as the positioning of said bank index therefrom in response to banking of said craft in a sense to produce a turn of the craft in a direction toward the desired heading, whereby an asymptotic approach to said desired heading may be effected by controlling the bank angle of the craft in a manner to maintain alignment between said bank index and said heading selector indicator.

11. An aircraft flight instrument of the character set forth in claim 10 wherein said fixed scale is calibrated as a non-linear function of heading deviations from an existing heading, and wherein said means for positioning said heading selector includes a corresponding non-linear functional drive whereby the character of said asymptotic approach to the desired heading is dependent upon said non-linear function.

12. A navigation indicator for aircraft comprising a reference index, a first indicator element mounted to move relative to said reference index, control means for moving said first indicator element to an amount and in a direction representative of a prescribed turn in azimuth and the direction of said turn to be made in the navigation of said aircraft, further control means responsive to turning of said craft in azimuth for returning said first indicator element toward said reference index as said craft turns in space, a gyro vertical, a second indicator element mounted to move relative to said reference index, control means for operating said second indicator under the control of said gyro vertical so the amount and direction of the displacement of said second indicator from said index will be dependent upon the amount and direction of the bank angle of the aircraft, said indicators and the control means therefor being so correlated and relatively arranged that both indicators may be matched in position by a banking of the aircraft and thereafter both indicators may be moved together toward said index by further controlling the bank angle as the prescribed turn is performed by the aircraft.

13. A navigation indicator for aircraft comprising a reference index, a first indicator mounted to move relative to said reference index to an amount and in a direction representing a prescribed turn in azimuth and the direction of said turn to be made in the navigation of said aircraft, means including a compass for controlling the operation of said first indicator element, a gyro vertical, a second indicator element mounted to move relative to said reference index, means for operating said second indicator under the control of said gyro vertical so the amount and direction of the displacement of said second indicator from said index will be dependent upon the amount and direction of the bank angle of the aircraft, said indicators and the control means therefor being so correlated and relatively arranged that both indicators may be matched in position by a banking of the aircraft and thereafter both indicators may be moved together toward said index by further controlling the bank angle as the prescribed turn is performed by the aircraft.

14. A navigation indicator for aircraft comprising an instrument housing having a substantially circular viewing opening therein, a reference index at the periphery of said opening, a first indicator element mounted to move relative to said reference index in an arcuate path substantially about the center of said opening as an axis, control means for moving said first indicating element away from said reference index to an amount and in a direction in accordance with a prescribed turn in azimuth and the direction of turn to be made in the navigation of said aircraft, further control means responsive to turning of said craft for moving said first indicator element toward said reference index upon turning of said craft in the direction of the prescribed turn, a gyro vertical, a second indicator element also mounted to move relative to said reference index in an arcuate path substantially about the center of said opening as an axis, control means for moving said second indicator element from said reference index in accordance with the amount and direction of the bank angle of the aircraft, said indicator elements and the control means therefor being so correlated and relatively arranged that both indicators may be matched in position by a banking of the aircraft and thereafter both indicators may be moved together toward said index by further controlling the bank angle as the prescribed turn is performed by the aircraft.

15. An aircraft navigation indicating instrument for aircraft having a substantially circular viewing opening therein, a fixed reference index at the periphery of said opening, a first indicator element mounted to move relative to said reference index in an arcuate path adjacent the periphery of said opening and substantially about the center of said opening as an axis, the amount and direction of movement of said first indicator element representing a prescribed turn in azimuth and the direction of said turn to be made in the navigation of said aircraft, means including a compass for controlling the operation of said first indicator element, a gyro vertical, a second indicator element also mounted to move relative to said reference index in an arcuate path adjacent the periphery of said opening and substantially about the center of the opening as an axis, control means for moving said second indicator element under the control of said gyro vertical so the amount and direction of the displacement of said second indicator from said index will be dependent upon the amount and direction of the bank angle of the aircraft, said indicators and the control means therefor being so correlated and relatively arranged that both indicators may be matched in position by a banking of the aircraft and thereafter both indicators may be moved together toward said index by further controlling the bank angle as the prescribed turn is performed by the aircraft.

References Cited in the file of this patent

UNITED STATES PATENTS

| | | |
|---|---|---|
| 349,026 | Hewison | May 19, 1931 |
| 1,924,037 | Henderson | Aug. 22, 1933 |
| 2,613,629 | Maybarduk | Oct. 14, 1952 |
| 2,639,686 | Duncan | May 26, 1953 |